(12) United States Patent
Hudson

(10) Patent No.: US 7,085,307 B2
(45) Date of Patent: Aug. 1, 2006

(54) METHODS AND APPARATUS FOR TRANSMITTING DATA OVER A CDMA NETWORK

(75) Inventor: John E Hudson, Stansted (GB)

(73) Assignee: Nortel Networks Limited, St. Laurent (CA)

( * ) Notice: Subject to any disclaimer, the term of this patent is extended or adjusted under 35 U.S.C. 154(b) by 689 days.

(21) Appl. No.: 10/109,749

(22) Filed: Mar. 29, 2002

(65) Prior Publication Data

US 2003/0185282 A1    Oct. 2, 2003

(51) Int. Cl.
*H04L 27/30* (2006.01)
(52) U.S. Cl. .................. 375/140; 375/141; 375/146
(58) Field of Classification Search ............... 375/140, 375/141, 144, 146–148, 346, 348; 455/52.3, 455/63, 65
See application file for complete search history.

(56) References Cited

U.S. PATENT DOCUMENTS

| 6,377,632 | B1* | 4/2002 | Paulraj et al. ............... 375/299 |
| 6,654,408 | B1* | 11/2003 | Kadous et al. ............... 375/148 |
| 6,731,668 | B1* | 5/2004 | Ketchum ..................... 375/130 |
| 6,882,619 | B1* | 4/2005 | Gerakoulis .................. 370/209 |

* cited by examiner

*Primary Examiner*—Dac V. Ha
(74) *Attorney, Agent, or Firm*—Barnes & ThornburgLLP

(57) ABSTRACT

The use of cyclic prefixes with OFDM transmissions is known. Typically the prefix length is chosen to be at least as long as the duration of significant multipath in the transmission channel. However, OFDM has disadvantages in terms of DSP load and transmitter power amplifier specifications. The use of a cyclic prefix with periodic CDMA codes has been found to yield equivalent performance in terms of orthogonality in a dispersive channel and yet overcomes the disadvantages of cyclically prefixed OFDM transmissions. Examples are given of Walsh Hadamard binary periodic codes.

10 Claims, 2 Drawing Sheets

PRIOR ART

Copy of last section repeated at the front

METHODS AND APPARATUS FOR TRANSMITTING DATA OVER A CDMA NETWORK

FIELD OF THE INVENTION

This invention relates to methods and apparatus for transmitting and receiving data using CDMA techniques.

BACKGROUND OF THE INVENTION

Direct sequence CDMA codes such as used in the 2G IS95 cellular system and the third generation TDD and FDD systems both in the US (CDMA2000) and Europe (UTRA) are defined to be orthogonal at the transmitter. In an ideal non-dispersive channel such as would be associated with line of sight propagation this orthogonality is preserved and the codes remain orthogonal at the receiver. A matched filter operation with replicas of the transmitter codes will separate the codes completely at the receiver and there is no loss of performance induced by the channel.

Under less favourable propagation conditions such as is commonly found in vehicular macro cells (>1 km radius) and for metropolitan or urban propagation there is significant multipath from buildings and the exact orthogonality of the codes is not preserved at the receiver. This means that there is cross talk between the codes and this is called "self noise" whereby interference (I) between code words becomes a significant degradation in addition to the usual thermal noise (N) which is always present. This self noise component means that signal to thermal noise ratios must be increased to maintain the overall carrier (C) to N+I ratio and this needs increased power to be used at the transmitters in either direction, causing increased interference to other cells and a drop in system capacity.

To prevent this loss, various measures can be taken to reduce the effects of channel dispersion. In time division duplex (TDD) third generation downlink systems linear minimum mean square error receivers are likely to be used as defined in A. Klein, G. K. Kaleh, P. W. Baier: "Zero forcing and minimum mean square error equalization for multiuser detection in code-division multiple access channels", IEEE Trans. Veh. Tech. 45(2), May 1996, pp. 276–287. This technique however has as a very large DSP load which is undesirable. In Frequency Division Duplex (FDD) systems with long code words the use of interference cancellation or multi-user decision feedback is a promising solution as discussed in H. Holma, A Toskala, "WCDMA for UMTS", Wiley 2000.

An alternative solution to the multipath problem is the use of orthogonal frequency division multiplexing (OFDM) in which lengthy orthogonal sinusoids are used as signalling waveforms as described in R. van Nee and R. Prasad; "OFDM for wireless multimedia communication", Artech, 2000. The duration of these sinusoids is many times the dispersion time of the channel, The effects of multipath are avoided by transmitting a cyclic prefix before the sinusoid as shown in FIG. 1, which has the effect of allowing the multipath to settle before the start of the real signalling word. This prefix, which is longer than the multipath duration, is excised at the receiver and the remaining part of the tone, having the original duration, is applied to a discrete Fourier Transform in the usual way.

When these received tones, with prefix removed, are matched-filtered with a Fast Fourier transform there is no intersymbol interference at the output and the signals remain orthogonal. Thus there is no self noise. The effect of the multipath is transformed from a time domain problem into a frequency dependence of the channel, i.e. different tones have a different received amplitude. However, the DSP load for OFDM is quite high and battery powered handsets, in particular, are put at a disadvantage when using this technique.

A further problem with OFDM is that many tones are transmitted simultaneously at the transmitter, typically 512 to 2048 and the peak to average Power Amplifier (PA) power ratio (PAPR) is high. This causes an increased cost at the transmitter PA which already accounts for typically 50% of the electronics component of a base station cost even for binary CDMA codes.

SUMMARY OF THE INVENTION

The invention is concerned with alternative transmitter signaling waveforms which have good PAPR and yet remain orthogonal at the receiver after propagation through a dispersive channel. In order to get this property it is necessary to retain the cyclic prefix mechanism of the prior art, however the signaling waveforms can be different from sinusoids and OFDM. In particular, it is possible to use certain standard binary CDMA codes as signaling waveforms and retain all the benefits of zero inter-code interference.

Accordingly, in a first aspect, the invention provides a method of transmitting data in a CDMA transmitter comprising choosing a periodic code word from a set of binary CDMA code words, modulating a signal carrying the data using the CDMA code word, adding a cyclic prefix to the modulated data which is of length greater than the duration of multipath in the transmission channel, and transmitting the modulated data.

In a second aspect, the invention provides a CDMA transmitter comprising a code word generator arranged to generate code words which are periodic and which come from a set of binary code words, a modulator arranged to modulate signals carrying data, using a generated CDMA code word, the modulator being further arranged to add a cyclic prefix to the modulated signal which is of length greater than the duration of multipath in the transmission channel, and transmission means arranged to transmit the modulate signal.

In a third aspect, the invention provides a CDMA signal spread with a periodic binary CDMA code word and including a cyclic prefix of length greater than the duration of multipath in the channel over which the signal is to be transmitted.

The invention also provides in a further aspect, a computer readable medium carrying a computer program which when executed on suitable hardware, such as a CDMA transmitter, causes the hardware to choose a periodic code word from a set of binary CDMA code words, modulate a signal carrying the data using the CDMA code word, adding a cyclic prefix to the modulated data which is of length greater than the duration of multipath in the transmission channel, and transmit the modulated data.

In a fourth aspect, the invention provides a receiver for CDMA transmissions arranged to remove a cyclic prefix before decoding a transmission.

In a yet further aspect, the invention provides a CDMA network including a transmitter and a receiver, the transmitter comprising a code word generator arranged to generate code words which are periodic and which come from a set of binary code words, a modulator arranged to modulate signals carrying data, using a generated CDMA code word, the modulator being further arranged to add a cyclic prefix to the modulated signal which is of length greater than the duration of multipath in the transmission channel, and transmission means arranged to transmit the modulated signal, and the receiver being arranged to remove the cyclic prefix before decoding a transmission.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

The basic mechanism is the following. If two different mutually orthogonal CDMA codes are periodic within their duration of N chips then, after passing through an arbitrary common discrete time dispersive channel with impulse response $h_k$, they have been found to remain orthogonal at the receiver when matched-filtered with a replica of themselves and the channel impulse response. This is the classical form of processing in a $2^{nd}$ generation RAKE receiver. It is assumed that a cyclic prefix is sent before the code word and removed at the receiver before filtering.

As an example of the process consider an 8 chip CDMA system and take two periodic code words $C_1(k)=\{1\ 1\ 1\ 1\ -1\ -1\ -1\ -1\}$ and $C_2(k)=\{1\ -1\ 1\ -1\ 1\ -1\ 1\ -1\}$. These code words, as transmitted, are obviously orthogonal.

The common channel impulse response is $h_k=\{1, 0.333, -0.5, -0.1646, 0, 0, 0.2, 0\}$ and with the cyclic prefix in place the periodic received signals are
$Y_1=\{1.532, 2.198, 0.798, 0.468, -1.532, -2.198, -0.798, -0.468\}$ and
$Y_2=\{1.798, -0.802, -1.798, 0.802, 1.798, -0.802, -1.798, 0.802\}$ It is easily verified that the cross product of these two periodic vectors is zero, i.e, they are orthogonal.

Figure 1:
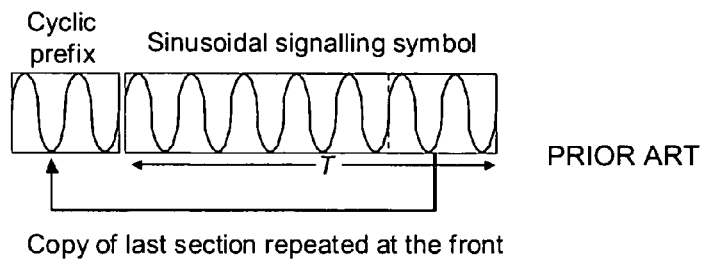
FIG. 1 is a schematic representation of a cyclic prefix in an OFDM system.
Figure 2:
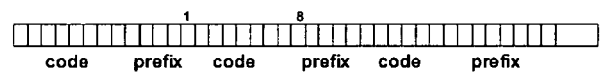
FIG. 2 is a schematic representation of cyclic prefixes used between CDMA code words.

FIG. 2 shows how the cyclic prefixes are included between code words in a binary CDMA system with a spreading factor of 8 and less than 3 chips of multipath dispersion.

This orthogonality property only holds exactly for periodic signaling waveforms, In the standard CDMA code set some of the code words are not periodic. Table I shows the complete set of Walsh Hadamard code words (in columns) for length N=8.

TABLE I

CDMA code set for length 8

| 1 | 1  | 1  | 1  | 1  | 1  | 1  | 1  |
|---|----|----|----|----|----|----|----|
| 1 | -1 | 1  | -1 | 1  | -1 | 1  | -1 |
| 1 | 1  | -1 | -1 | 1  | 1  | -1 | -1 |
| 1 | -1 | -1 | 1  | 1  | -1 | -1 | 1  |

TABLE I-continued

CDMA code set for length 8

| 1 | 1  | 1  | 1  | -1 | -1 | -1 | -1 |
|---|----|----|----|----|----|----|----|
| 1 | -1 | 1  | -1 | -1 | 1  | -1 | 1  |
| 1 | 1  | -1 | -1 | -1 | -1 | 1  | 1  |
| 1 | -1 | -1 | 1  | -1 | 1  | 1  | -1 |

Columns 1, 2, 3, 4, 5 are periodic whereas columns 6, 7, and 8 are not. Table II shows the complete set of received signal vectors $y_{jk}$ received when these code words are transmitted on the channel with a cyclic prefix

TABLE II

Recieved vectors for prefixed vectors

| 0.87 | 0.53  | 0.80  | 1.80  | 1.53  | 1.87  | 0.80  | -0.20 |
|------|-------|-------|-------|-------|-------|-------|-------|
| 0.87 | -0.53 | 1.80  | -0.80 | 2.20  | -1.20 | 0.47  | -0.13 |
| 0.87 | 0.53  | -0.80 | -1.80 | 0.80  | -0.20 | -1.53 | -1.87 |
| 0.87 | -0.53 | -1.80 | 0.80  | 0.47  | -0.13 | -2.20 | 1.20  |
| 0.87 | 0.53  | 0.80  | 1.80  | -1.53 | -1.87 | -0.80 | 0.20  |
| 0.87 | -0.53 | 1.80  | -0.80 | -2.20 | 1.20  | -0.47 | 0.13  |
| 0.87 | 0.53  | -0.80 | -1.80 | -0.80 | 0.20  | 1.53  | 1.87  |
| 0.87 | -0.53 | -1.80 | 0.80  | 0.47  | 0.13  | 2.20  | -1.20 |

All 64 cross products $\phi_{ij}$ of these vectors have been calculated and are shown in table III;

TABLE III

Cross products for prefixed vectors at the receiver

| 6.03 | 0.00 | 0.00  | 0.00  | 0.00  | 0.00  | 0.00  | 0.00  |
|------|------|-------|-------|-------|-------|-------|-------|
| 0.00 | 2.26 | 0.00  | 0.00  | 0.00  | 0.00  | 0.00  | 0.00  |
| 0.00 | 0.00 | 15.50 | 0.00  | 0.00  | 0.00  | 0.00  | 0.00  |
| 0.00 | 0.00 | 0.00  | 15.50 | 0.00  | 0.00  | 0.00  | 0.00  |
| 0.00 | 0.00 | 0.00  | 0.00  | 16.06 | 0.00  | 0.00  | -3.04 |
| 0.00 | 0.00 | 0.00  | 0.00  | 0.00  | 9.99  | 3.04  | 0.00  |
| 0.00 | 0.00 | 0.00  | 0.00  | 0.00  | 3.04  | 16.06 | 0.00  |
| 0.00 | 0.00 | 0.00  | 0.00  | -3.04 | 0.00  | 0.00  | 9.99  |

This matrix confirms that the six code words 1–5 and 7 are mutually orthogonal since the leading 5×5 submatrix is diagonal and column 7 does not correlate with columns 1–5. There are significant cross products between the other vectors. If the cyclic prefix is removed then the cross products become rather random. Table IV shows the received vectors and Table V the cross products under this condition.

TABLE IV

Received vectors for non-prefixed data

| 1.00 | 1.00  | 1.00  | 1.00  | 1.00  | 1.00  | 1.00  | 1.00  |
|------|-------|-------|-------|-------|-------|-------|-------|
| 1.33 | -0.67 | 1.33  | -0.67 | 1.33  | -0.67 | 1.33  | -0.67 |
| 0.83 | 0.17  | -1.17 | -1.83 | 0.83  | 0.17  | -1.17 | -1.83 |
| 0.67 | -0.33 | -2.00 | 1.00  | 0.67  | -0.33 | -2.00 | 1.00  |
| 0.67 | 0.33  | 1.00  | 2.00  | -1.33 | -1.67 | -1.00 | 0.00  |
| 0.67 | -0.33 | 2.00  | -1.00 | -2.00 | 1.00  | -0.67 | 0.33  |
| 0.87 | 0.53  | -0.80 | -1.80 | -0.80 | 0.20  | 1.53  | 1.87  |
| 0.87 | -0.53 | -1.80 | 0.80  | -0.47 | 0.13  | 2.20  | -1.20 |

TABLE V

| \multicolumn{8}{c}{Cross products for non-prefixed data} | | | | | | | |
|---|---|---|---|---|---|---|---|
| 6.32 | 0.03 | 0.22 | −0.95 | 0.59 | −0.13 | 2.59 | 0.05 |
| 0.03 | 2.37 | 0.78 | 0.42 | 0.07 | 0.73 | 0.12 | 2.33 |
| 0.22 | 0.78 | 17.00 | 0.25 | −3.37 | 0.51 | 0.62 | 1.57 |
| −0.95 | 0.42 | 0.25 | 14.68 | −0.35 | −3.78 | −2.07 | 1.15 |
| 0.59 | 0.07 | −3.37 | −0.35 | 10.54 | 0.03 | 0.88 | −2.33 |
| −0.13 | 0.73 | 0.51 | −3.78 | 0.03 | 5.43 | 2.17 | 1.35 |
| 2.59 | 0.12 | 0.62 | −2.07 | 0.88 | 2.17 | 16.75 | 0.25 |
| 0.05 | 2.33 | 1.57 | 1.15 | −2.33 | 1.35 | 0.25 | 10.86 |

It can be seen that the cross products between non-periodic code words is not dissimilar when the prefix is removed but the cross products between periodic code words is much greater. Overall there is a significant reduction in the cross products, even including the effect of the non-periodic waveforms.

For a CDMA signaling set of N chips the number of periodic code words as a proportion of the whole reduces as N gets larger. There is one "DC" word of all ones, two words of period N with a "90°" relative phase shift, e.g. columns 5 and 7 of table I, two words with period N/2 (columns 3, 4) etc until we get down to two shortest words of period 4. Finally there is an isolated word with period 2 (column 2 of table II). Thus the total number of periodic code words is $$2(1+1_{(N)}+1_{[N/2]}+ \ldots + \ldots 1_{[4]})=2\,\mathrm{Log}_2(N)$$

Therefore the technique is mainly of interest for code words of length N=8 or less which offers 6 periodic words out of a total of 8 whereas the N=16 set only offers 8 words. This is not problem in high speed wireless packet data systems where shorter code words are desirable to reduce DSP load in the terminal. 3G uses code words of 16 or less for TDD use and of down to length 4 for FDD operation. When longer code words are used, the effect of channel dispersion gets smaller in any case due to increasing gain of the code words so multipath reduction is less of a problem. As a consequence the likely applications of this technique are for low cost terminals in high speed packet systems where the spreading factors are 8 or less.

It is also desirable that the multipath dispersion is less than one or two chips otherwise the duration of the cyclic prefix is a significant part of the code word length and energy is lost. These conditions are typically found in picocells and indoors. However since the cyclic prefix can be used for channel estimation its energy is not totally lost.

Figure 3:
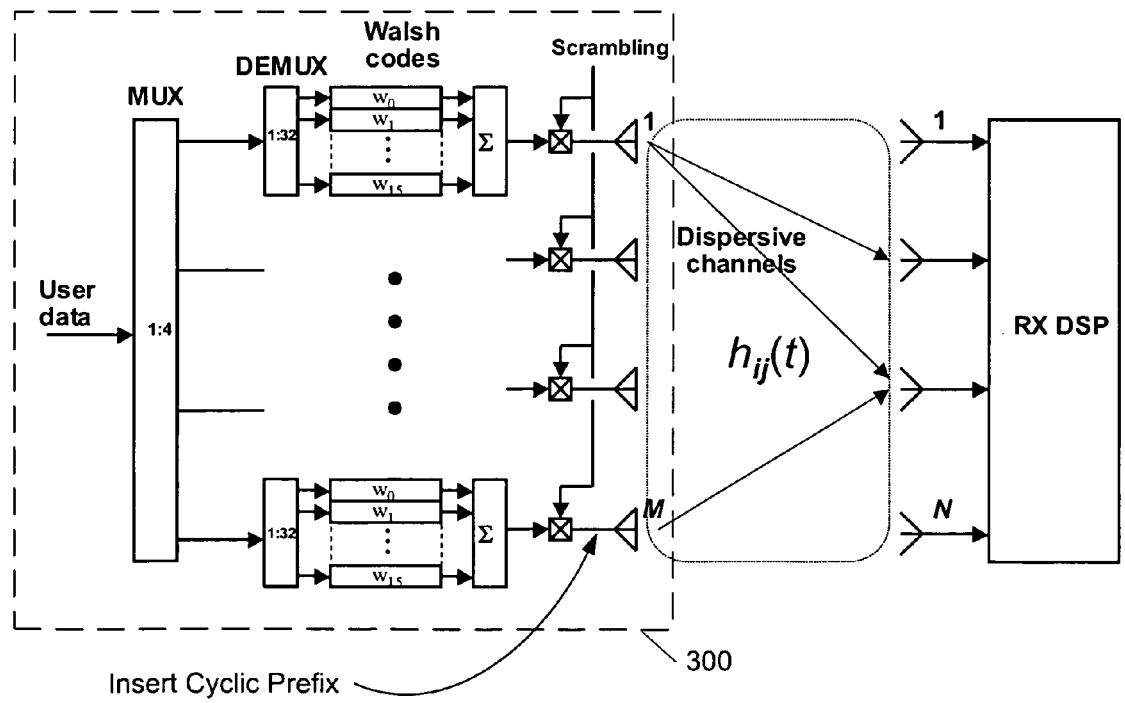
FIG. 3 is a schematic block diagram of an exemplary transmitter using 16 Walsh codes.
Figure 4:
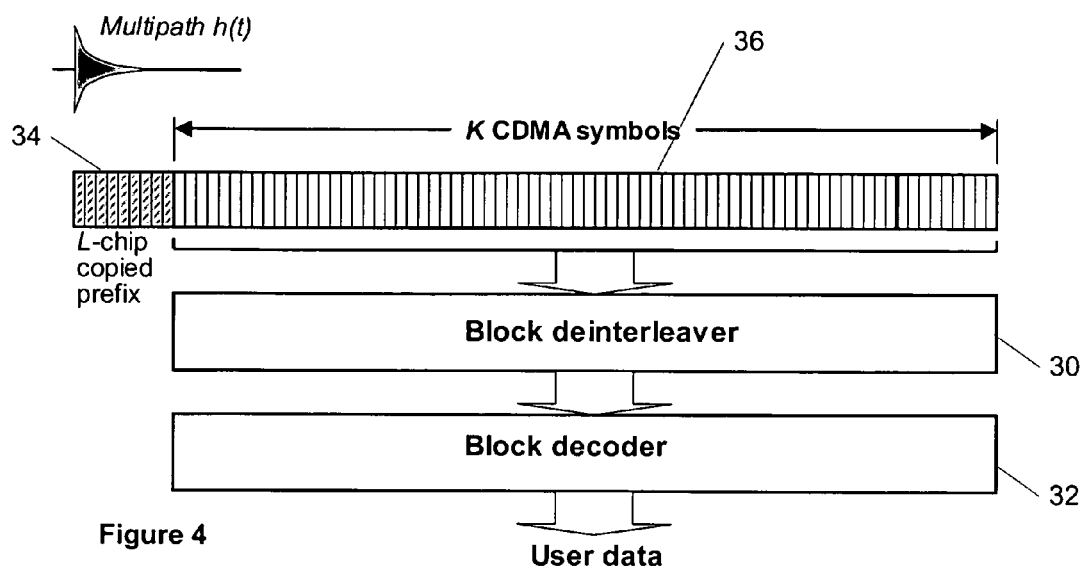
FIG. 4 is a schematic representation of an exemplary receiver.

With reference to FIG. 3, typically, the cyclic prefix 34 is inserted by the transmitter 300 after scrambling as it needed to operate directly on the physical layer multipath. The situation at the receiver is illustrated in FIG. 4. For decoding, the prefix is removed and the remaining block 36 is deinterleaved 30 and decoded 32.

It will be appreciated that although the description above has dealt with the use of a subset of the commonly used Walsh-Hadamard codes, other code words may be designed with the orthogonality properties described above and which are neither binary CDMA code words nor sinusoidal OFDM and which have periodic properties. The invention is accordingly to be understood not to be limited to Walsh-Hadamard codes. Instead, code words may be multilevel codes and/or complex valued codes such that each point in the code sequence is selected from a complex OAM constellation.

It will also be appreciated that in multiple input–multiple output antenna systems (MIMO), for example, the use of such periodic CDMA code words can offer a reduction in self noise and mutual interference in multipath channels.

What I claim is:

1. A method of modulating data in a CDMA transmitter comprising:
   (a) choosing a periodic code word from a set of CDMA code words, and
   (b) modulating a signal carrying the data using the periodic code word, adding a cyclic prefix to the modulated data which is of length greater than the duration of multipath in the transmission channel.

2. A method according to claim 1, wherein the chosen code words are selected from the group of code words containing binary code words, multilevel code words and complex valued code words.

3. A method according to claim 1, wherein the code word length is 8 or less.

4. A CDMA transmitter comprising a code word generator arranged to generate code words which are periodic and which come from a set of code words, a modulator arranged to modulate signals carrying data, using a generated periodic code word, the modulator being further arranged to add a cyclic prefix to the modulated signal which is of length greater than the duration of multipath in the transmission channel, and transmission means arranged to transmit the modulated signal.

5. A CDMA transmitter according to claim 4, forming part of a network and being arranged to generate transmissions over a plurality of channels, a separate one of the generated code words being assigned for transmissions over each respective channel.

6. CDMA transmitter according to claim 5, wherein the relationship between code word length N and the maximum number of orthogonal channels $n_c$ is given by $n_c=2\mathrm{Log}_2(N)$.

7. A transmitter according to claim 4, wherein the code generator is operable to generate code words which are selected from the group of code words containing binary code words, multilevel code words and complex valued code words.

8. A computer readable medium carrying computer program which when executed on suitable hardware causes the hardware to:
   (a) choose a periodic code word from a set of CDMA code words,
   (b) modulate a signal carrying the data using the periodic code word, adding a cyclic prefix to the modulated data which is of length greater than the duration of multipath in the transmission channel, and
   (c) transmit the modulated data.

9. A CDMA network including a transmitter and a receiver, the transmitter comprising a code word generator arranged to generate code words which are periodic and which come from a set of code words, a modulator arranged to modulate signals carrying data, using a generated periodic code word, the modulator being further arranged to add a cyclic prefix to the modulated signal which is of length greater than the duration of multipath in the transmission channel, and transmission means arranged to transmit the modulated signal, and the receiver being arranged to remove the cyclic prefix before decoding a transmission.

10. A network according to claim 9, wherein the code generator is operable to generate code words which are selected from the group of code words containing binary code words, multilevel code words and complex valued code words.

* * * * *